United States Patent
Arita et al.

(10) Patent No.: US 7,896,536 B2
(45) Date of Patent: Mar. 1, 2011

(54) PLANER LIGHT SOURCE DEVICE

(75) Inventors: Kenji Arita, Kumamoto (JP); Takuya Sakamoto, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 241 days.

(21) Appl. No.: 11/943,098

(22) Filed: Nov. 20, 2007

(65) Prior Publication Data

US 2008/0123336 A1 May 29, 2008

(30) Foreign Application Priority Data

Nov. 28, 2006 (JP) .............................. 2006-320592

(51) Int. Cl.
*F21V 7/04* (2006.01)
(52) U.S. Cl. ...................... 362/633; 362/634; 362/632
(58) Field of Classification Search ............... 362/97.1, 362/97.2, 362, 632, 633, 634; 349/58
See application file for complete search history.

(56) References Cited

U.S. PATENT DOCUMENTS 7,641,377 B2   1/2010   Nishida et al.

2004/0246397 A1 * 12/2004 Kang et al. .................... 349/58
2006/0290836 A1 * 12/2006 Chang .......................... 349/58
2007/0097284 A1 *  5/2007 Ho et al. ....................... 349/58
2007/0279728 A1 * 12/2007 Murakata ..................... 349/58

FOREIGN PATENT DOCUMENTS

| CN | 2685921 | 3/2005 |
| CN | 1661440 | 8/2005 |
| JP | 2002-40394 | 6/2002 |
| JP | 2003-279934 | 10/2003 |

* cited by examiner

*Primary Examiner*—Y My Quach Lee
(74) *Attorney, Agent, or Firm*—Oblon, Spivak, McClelland, Maier & Neustadt, L.L.P.

(57) ABSTRACT

A light source supporting member supports a light source and has a first face and a second face opposite to the first face. A light guide plate has a side face opposed to the first face of the light source supporting member and a light emitting face that emits light from the light source. A metal frame supports the light guide plate. A resin frame overlies the second face of the light source supporting member and includes a connection part that connects with the metal frame within a plate thickness of the metal frame. The connection part includes a convex part including a projection portion projecting from the convex part. The projection portion extends toward the metal frame to overlie the second face of the light source supporting member. The metal frame includes a concave part including a recessed part engaged with the projection portion.

9 Claims, 8 Drawing Sheets

PLANER LIGHT SOURCE DEVICE

CROSS-REFERENCE TO RELATED APPLICATIONS

This application is based upon and claims the benefit of priority from Japanese Patent Application No. 2006-320592, filed on Nov. 28, 2006, the entire contents of which are incorporated herein by reference.

BACKGROUND OF THE INVENTION

1. Field of the Invention

The present invention relates to a planer light source device using a light source.

2. Description of the Related Art

A planer light source device, for example, a planer light source device of a non-emissive display device such as a liquid crystal display, has a side light type (also called an edge light type) and a direct type. The planer light source device of the side light type has a light source disposed on the side face of a rear frame, whereas the planer light source device of the direct type has a light source disposed on the rear face of the rear frame opposed to a display part.

Also, the planer light source device of the side light type includes a light guide plate for guiding the light from the light source in a desired direction, in which the light emitted from the light source including a linear light source such as a Cold Cathode Fluorescent Lamp (hereinafter referred to as CCFL) or a point light source such as a Light Emitting Diode (hereinafter referred to as LED) is reflected within the light guide plate and diffused with a diffusion pattern provided within the light guide plate to direct the light at a display screen.

Further, a middle frame is disposed for sandwiching the light guide plate with the rear frame. A display panel is provided on the screen side of the light guide plate. A front frame that supports the display panel, the middle frame and the rear frame and has an opening is disposed on the screen side of the display panel.

In the planer light source device, a step portion is provided on the side face of the middle frame, and a claw portion provided on the rear frame is fitted into the step portion of the middle frame to fix the middle frame and the rear frame together.

Also, in the planer light source device (e.g., see JP-A-2002-40394), a window is provided in an engagement piece of a back face frame in contact with the side face of an intermediate frame, and engaged by a projection provided in the intermediate frame to fix the intermediate frame and the back face frame.

However, it is required to provide the step portion or projection on the side face of the middle frame, so that the thickness of the side face of the middle frame is increased. Also, since the side face of the middle frame and the side face of the rear frame overlap, the planer light source device has a wider frame area (wider peripheral area of the frame of the display screen).

Further, the peripheral portion of the light source is heated to high temperature due to heat generated from the light source, which cases the emission light flux of the light source to be lower and results in a problem that the light source is degraded in the life and reliability. Thus, there is a demand that the contact area between a lamp reflector and the rear frame is increased, whereby it is difficult to provide a fixing structure of the middle frame and the rear frame, which results in a problem that a movement occurs due to vibration or shock.

Also, in JP-A-2002-40394, since the projection provided in the intermediate frame is not overlaid on the side face of a reflective sheet, the positional regulation of the reflective sheet could not be made when the planer light source device is assembled from the intermediate frame.

SUMMARY OF THE INVENTION

This invention has been achieved in the light of the above-mentioned problems, and it is an object of the invention to provide a planer light source device using a light source with a narrow frame, which is superior in the assembling ability and the vibration and shock resistance without increasing the manufacturing processes.

According to an aspect of the invention, there is provided a planer light source device includes: a light source; a light source supporting member configured to support the light source and having a first face and a second face that is opposite to the first face; a light guide plate having a side face opposed to the first face of the light source supporting member and a light emitting face for emitting light from the light source; a metal frame configured to support the light guide plate; and a resin frame disposed to be overlaid on the second face of the light source supporting member. The resin frame includes a connection part for connecting with the metal frame within a plate thickness of the metal frame.

DETAILED DESCRIPTION OF THE PREFERRED EMBODIMENTS

The preferred embodiments of the invention will be described below. The following explanation is intended for explaining the embodiments of the invention, but the invention is not limited to the following embodiments. To clarify the explanation, the following explanation may be appropriately omitted or simplified. Also, it is apparent to those skilled in the art that the components of the following embodiments may be easily changed, added or replaced within the scope of the invention.

Embodiment 1

Figure 1:
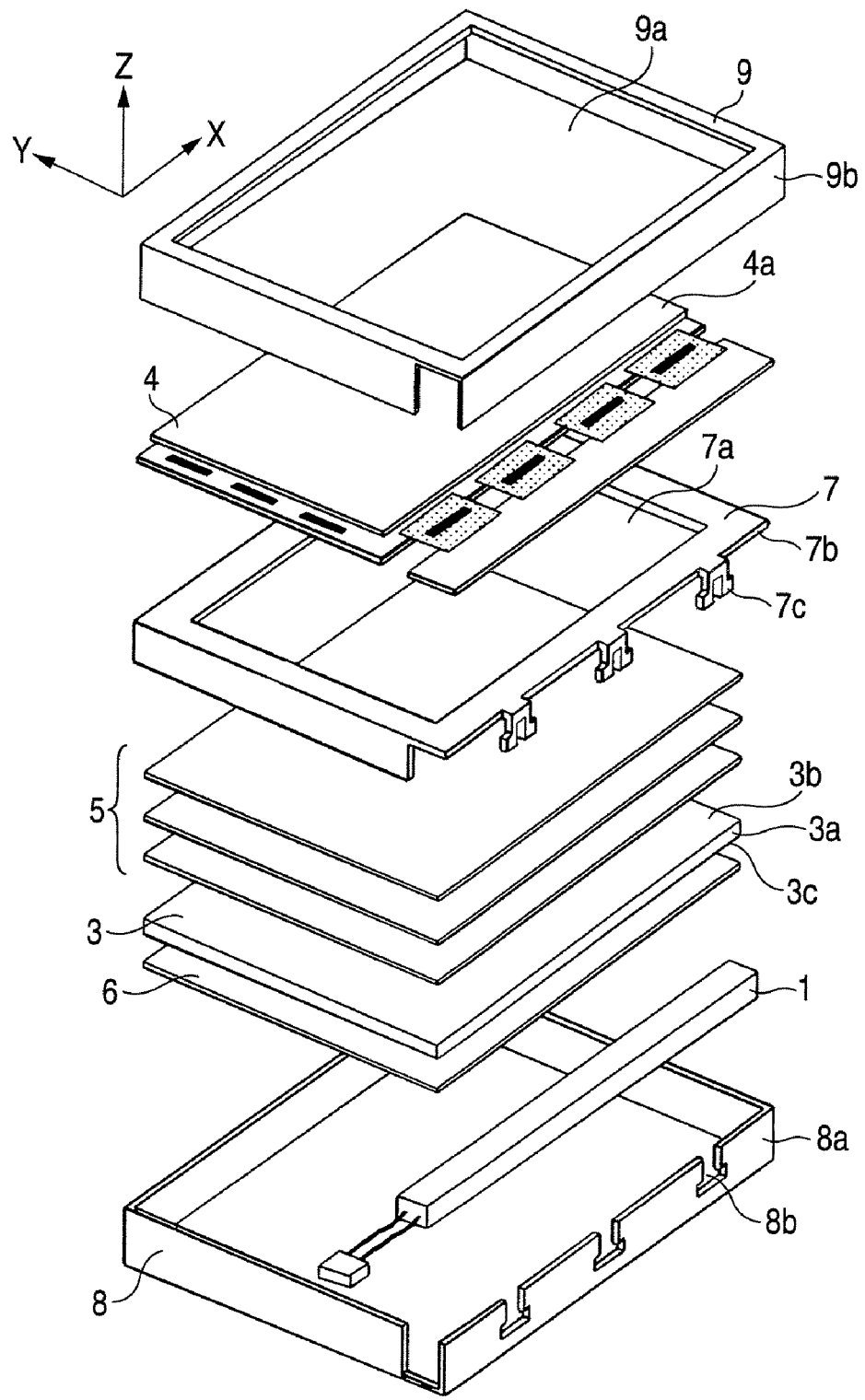
FIG. 1 is an exploded perspective view of a planer light source device according to an embodiment 1 of the present invention.
Figure 2A:
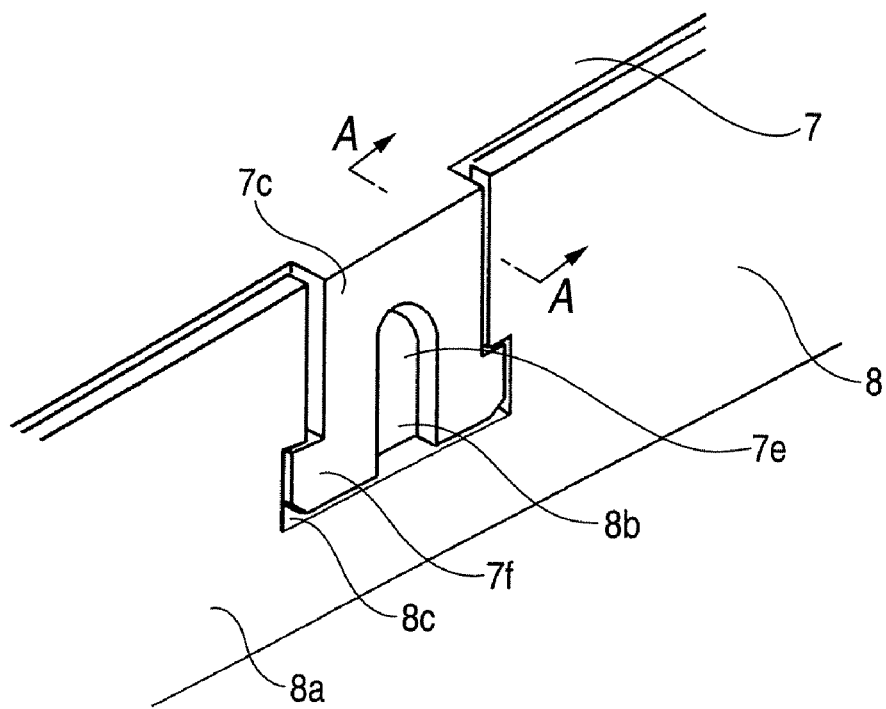
FIGS. 2A and 2B are views for explaining a connection part between a middle frame and a rear frame according to the embodiment 1 of the invention.
Figure 2B:
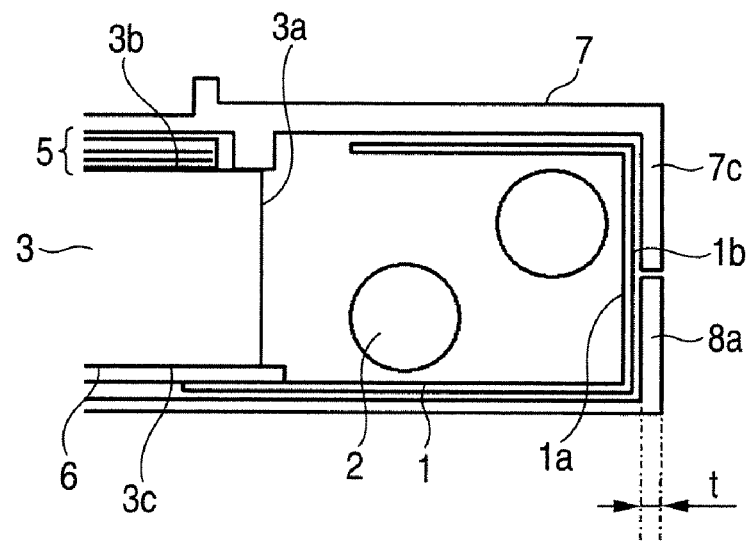
Figure 3:
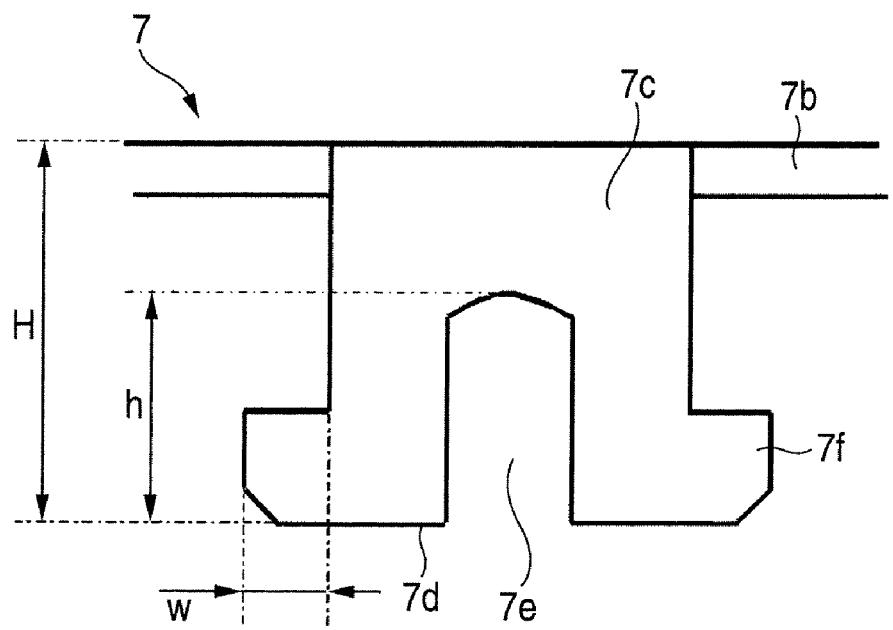
FIG. 3 is a front view for explaining a convex part of the middle frame according to the embodiment 1 of the invention.
Figure 4:
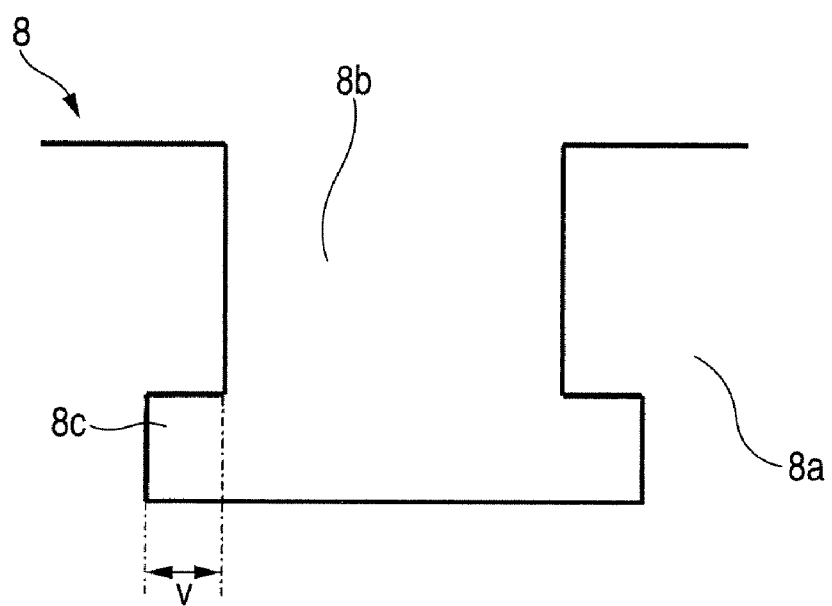
FIG. 4 is a front view for explaining a concave part of the rear frame according to the embodiment 1 of the invention.
Figure 5:
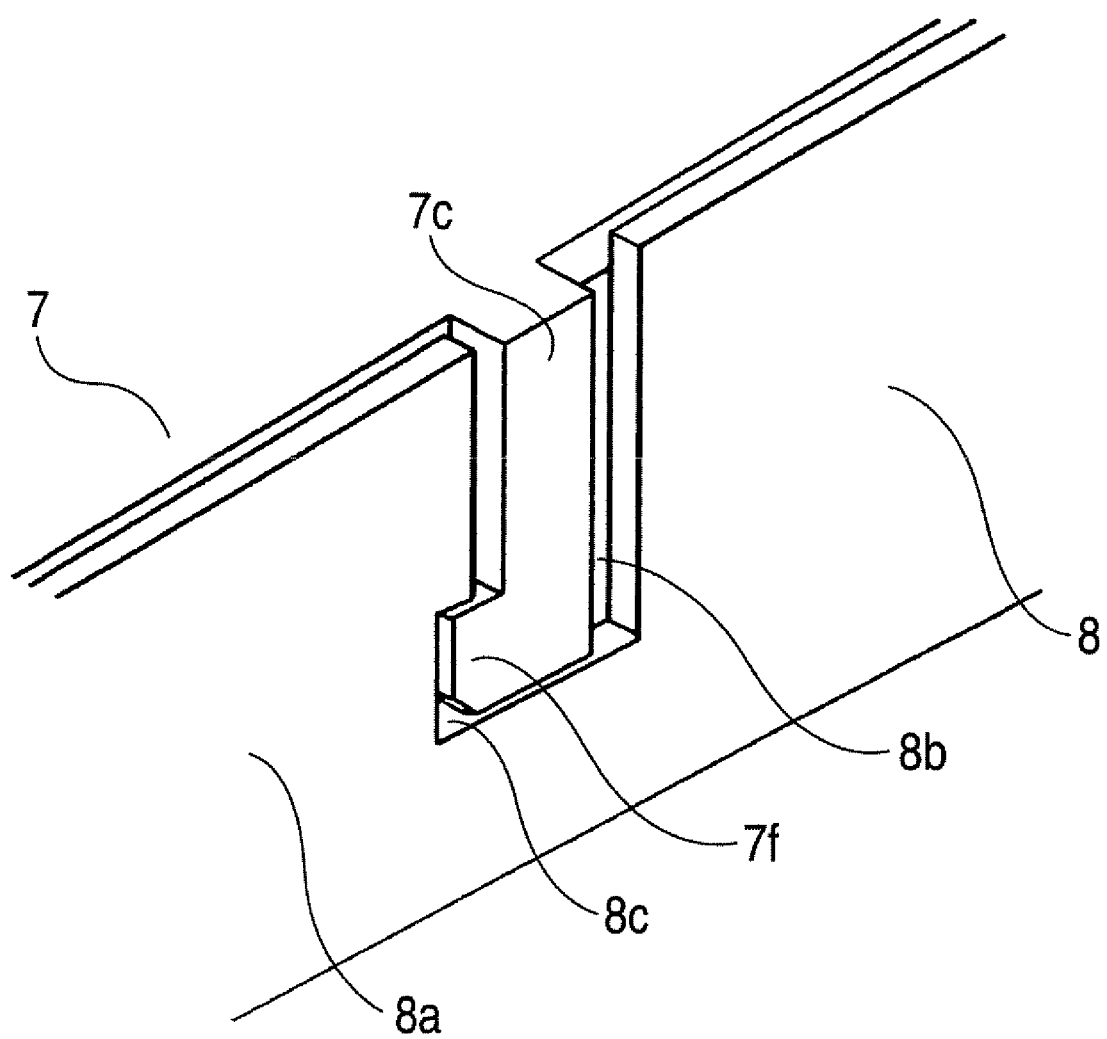
FIG. 5 is a view for explaining another connection part between the middle frame and the rear frame according to the embodiment 1 of the invention.

FIG. 1 is an exploded perspective view of a planer light source device according to an embodiment 1 of the invention. FIG. 2A is a view for explaining a connection part between a middle frame 7 and a rear frame 8 according to the embodiment 1 of the invention and FIG. 2B is a cross-sectional view of FIG. 2A, taken along the line A-A. FIG. 3 is a front view for explaining a convex part 7c of the middle frame 7 according to the embodiment 1 of the invention. FIG. 4 is a front view for explaining a concave part 8b of the rear frame 8 according to the embodiment 1 of the invention. FIG. 5 is a view for explaining another connection part between the middle frame 7 and the rear frame 8 according to the embodiment 1 of the invention.

In FIGS. 1 to 5, a light source 2 such as a cold cathode fluorescent lamp (CCFL) covered with a lamp reflector 1 that is a light source supporting member is disposed near a side face 3a of a light guide plate 3. The light from the light source 2 is incident on the side face 3a of the light guide plate 3, and emitted from a light emitting face 3b of the light guide plate 3 (herein, the light emitting face means an upper surface of the light guide plate 3 as seen in the drawing). The optical sheets 5 such as a diffusion sheet for diffusing the light from the light source 2 and illuminating the display panel 4 uniformly, and a lens sheet for changing the angle of light from the light source 1 and increasing the brightness on a display screen 4a of a display panel 4 in the front direction are provided on the light emitting face 3b of the light guide plate 3, and a reflective sheet 6 for effectively reflecting the light from the light source 1 to the light emitting face 3b of the light guide plate 3 is provided on a counter light emitting face 3c of the light guide plate 3 (herein, the counter light emitting face means a lower surface of the light guide plate 3 as seen in the drawing).

The lamp reflector 1, the light source 2, the light guide plate 3, the optical sheets 5 and the reflective sheet 6 are sandwiched between the middle frame 7 made of resin and the rear frame 8 made of metal. The middle frame 7 is provided with an opening 7a, which corresponds to the light emitting face 3b of the light guide plate 3. The light emitted from the light emitting face 3b of the light guide plate 3 emanates through the opening 7a of the middle frame 7.

Further, the lamp reflector 1, the light source 2, the light guide plate 3, the display panel 4, the optical sheets 5, the reflective sheet 6, the middle frame 7 and the rear frame 8 are supported by a front frame 9 having an opening 9a.

Though the lamp reflector 1 and the light source 2 are provided on only one side face 3a of the light guide plate 3 in FIG. 1, the invention is not limited to this configuration, but the light source and a light source board may be provided on two or more side faces of the light guide plate. Further, the light source 1 may be a point light source such as an LED or a laser diode (Laser Diode), in which if the point light source is employed, it is mounted and disposed on the light source board.

Also, the light guide plate 3 is made of resin such as polyethylene terephthalate (PET), acrylic (such as PMMA: polymethyl methacrylate), polycarbonate (PC) or cycloolefin, or glass. Further, a light scattering portion (not shown) for disordering the light propagation direction to guide the light to the light emitting face 3b is formed on the counter light emitting face 3c of the light guide plate 3. This light scattering portion functions as means for taking the light out of the light guide plate 3 by disordering the total reflection condition of light propagating within the light guide plate. More specifically, the means for scattering may be a method for printing the dot pattern on the counter light emitting face 3c of the light guide plate 3, a method for roughening the counter light emitting face 3c, or a method for forming the counter light emitting face 3c with irregularities such as micro spheres or prisms for changing the propagation direction of light.

Also, the optical sheets 5 have the lens sheet sandwiched between the diffusion sheets, for example. Also, to increase the brightness of the display panel 4, a plurality of lens sheets may be combined in consideration of the direction of prisms formed on the surface of the lens sheet. Also, the diffusion sheet may be a combination of two or more sheets to improve the diffusivity. It is preferable to optimize the use of the optical sheets 5 in view of the required brightness or flux distribution characteristic.

Further, the reflective sheet 6 may be made of a material of polypropylene (PP) or polyethylene terephthalate (PET) mixed with barium sulfate or titanium oxide, a material of resin formed with minute bubbles, a material of metal plate on which silver is deposited, or a material of metal plate coated with paint containing titanium oxide.

As shown in FIGS. 1 to 4, in this embodiment, a side face 7b of the middle frame 7 made of resin such as polycarbonate (PC) or acrylonitrile/butadiene/styrene (ABS) has a convex part 7c connected with a concave part 8b formed on a side face 8a of the rear frame 8 containing a metal frame made of aluminum, stainless or iron within the plate thickness t of the rear frame 8 on the opposite face 1b of the side face 1a of the lamp reflector 1 opposed to the side face 3a of the light guide plate 3. With this convex part 7c, when the planer light source device is assembled in the order of the optical sheets 5, the light guide plate 3, the reflective sheet 6, the lamp reflector 1 and the rear frame 8 by turning the middle frame 7 upside down, the positional regulation for disposing the lamp reflector 1 is facilitated.

Since the side face 8a of the rear frame 8 is contact with the face 1b of the lamp reflector 1, it has a function of conducting the heat of the lamp reflector 1 that is heated to high temperature due to heat generated from the light source 2 to the rear frame 8 and dissipating the heat to the surroundings. Particularly, if an aluminum housing having high thermal conductivity is employed for the rear frame 8, the heat from the light source 2 can be diffused efficiently to decrease the temperature of the light source 2.

Also, since it is unnecessary to provide a step portion or projection having the plate thickness or more on the side face 7b of the middle frame 7, the thickness of the side face 7b of the middle frame 7 can be suppressed within the plate thickness. Therefore, the structure of the middle frame 7 is simplified, whereby the thickness and weight can be reduced. Further, since the side face 7b of the middle frame 7 and the side face 8a of the rear frame 8 are connected within the plate thickness of the rear frame 8, the planer light source device can have a narrower frame at the periphery of the display screen.

As shown in FIG. 3, the convex part 7c of the middle frame 7 and the concave part 8b formed on the side face 8a of the rear frame 8 can be easily fitted together by forming a notch 7e on the convex part 7c of the middle frame 7 to reach a top face 7d of the convex part 7c.

As shown in FIGS. 3 and 4, a projection part 7f overlaid on the opposite face 1b of the side face 1a of the lamp reflector 1 opposed to the side face 3a of the light guide plate 3 is formed in the convex part 7c of the middle frame 7, and a lock part 8c engaged by the projection part 7f is formed within the plate thickness t of the rear frame 8 at the position corresponding to the projection part 7f of the middle frame 7 in the concave part 8b formed on the side face 8a of the rear frame 8. Thereby, the middle frame 7 and the rear frame 8 can be fixed more tightly.

When a vibration or shock is applied from the outside, it is possible to regulate the movement of the lamp reflector 1, the light source 2, the light guide plate 3, the optical sheets 5 and the reflective sheet 6.

Assuming that the height of the notch 7e from the top face 7d of the convex part 7c in the middle frame 7 is h, and the height of the convex part 7c having convex-like shape in the middle frame 7 is H, as the value of H-h (which is the deference between the height H of the convex part 7c and the height h of the notch 7e) is smaller, the convex part 7c having convex-like shape in the middle frame 7 and the concave part 8b formed on the side face 8a in the rear frame 8 can be fitted together more easily. As the value of H-h is larger, the middle frame 7 and the rear frame 8 can be fixed more tightly.

Next, assuming that the width of the projection part 7f in the middle frame 7 is w as shown in FIGS. 3 and 4, as the value of w is larger, the engagement strength of the projection part 7f of the middle frame 7 with the lock part 8c of the rear frame 8 is increased. Also, assuming that the width of the lock part 8c in the rear frame 8 is v, v≧w is particularly preferable to fix the projection part 7f in the middle frame 7 and the lock part 8c in the rear frame 8 securely.

Also, though in this embodiment, the projection part 7f formed in the convex part 7c of the middle frame 7 is formed on both sides of the notch 7e, the projection part 7f may be formed on only one side, and fixed with the lock part 8c in the rear frame 8, as shown in FIG. 5. Since the other configurations and effects are analogous, the explanation thereof is omitted.

Embodiment 2

Referring to FIGS. 6 and 7, an embodiment 2 of the invention will be described below. In this embodiment, the configurations of the lamp reflector 1, the light source 2, the light guide plate 3, the display panel 4, the optical sheets 5, the reflective sheet 6, and the middle frame 7 is the same as in the embodiment 1, wherein the same reference numerals are attached to those parts, and the explanation thereof is omitted. In the following explanation, the shape of the rear frame 8 and the front frame 9 will be particularly described with reference to FIGS. 6 and 7. Herein, the same reference numerals are attached to the same parts as in FIGS. 1 to 5.

Figure 6A:
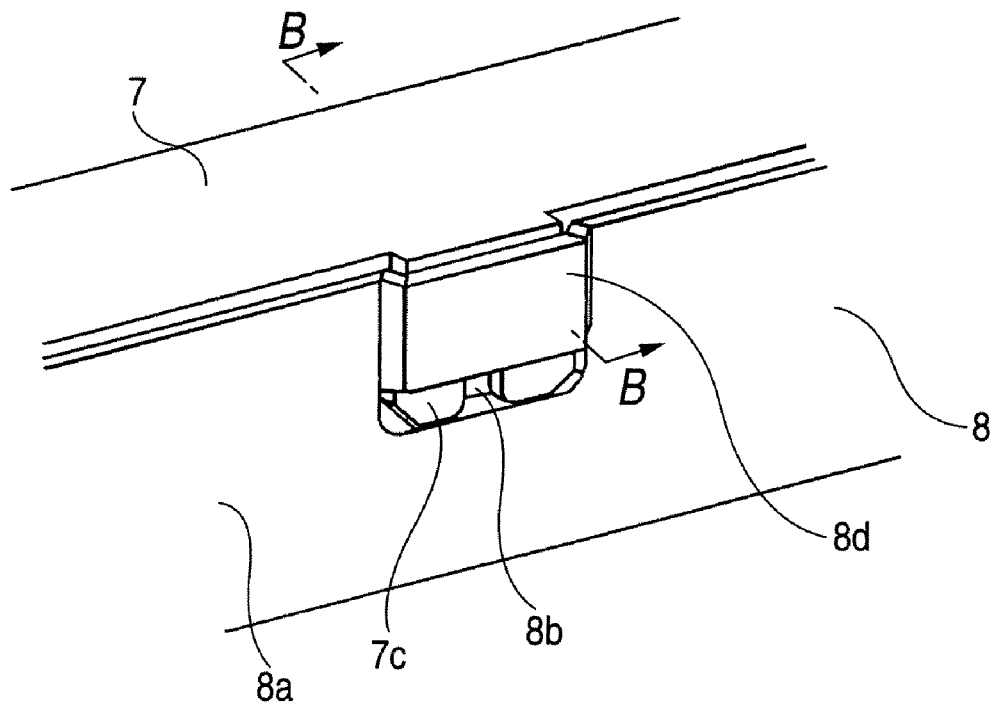
FIGS. 6A and 6B are views for explaining a connection part between the middle frame and the rear frame according to an embodiment 2 of the invention.
Figure 6B:
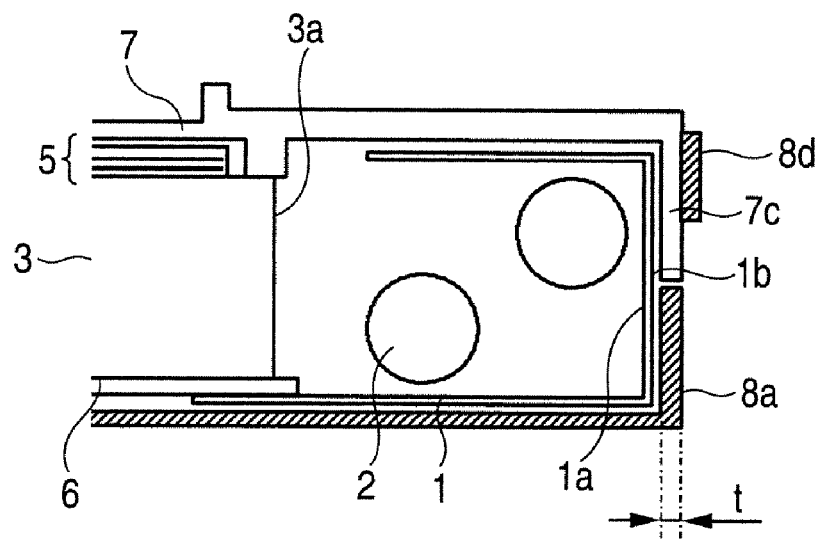
Figure 7A:
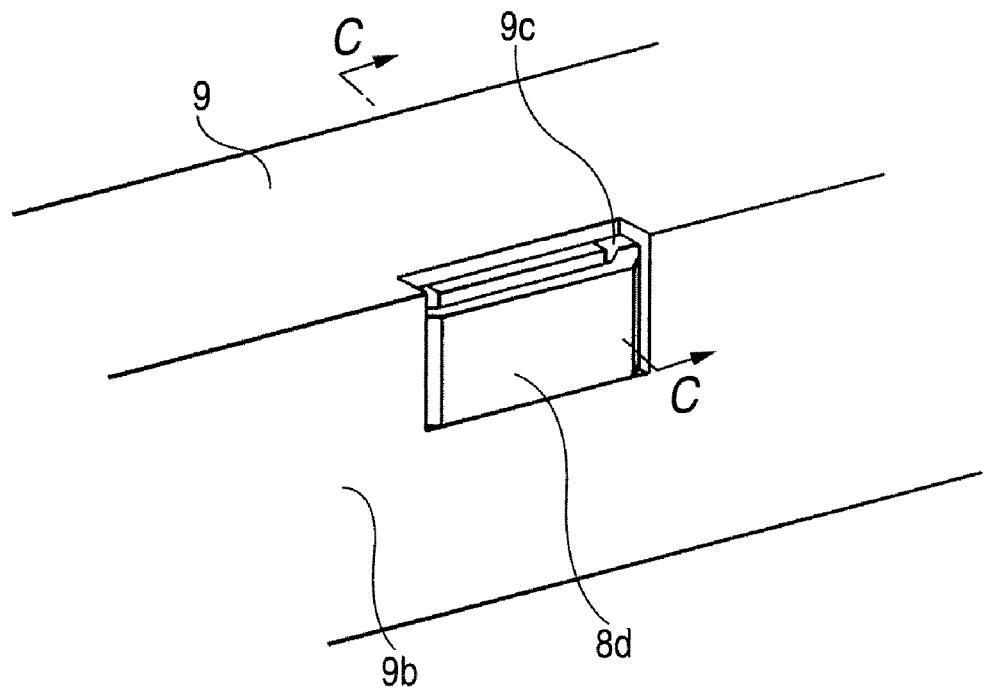
FIGS. 7A and 7B are views for explaining a method for fitting the rear frame and the front frame according to the embodiment 2 of the invention.
Figure 7B:
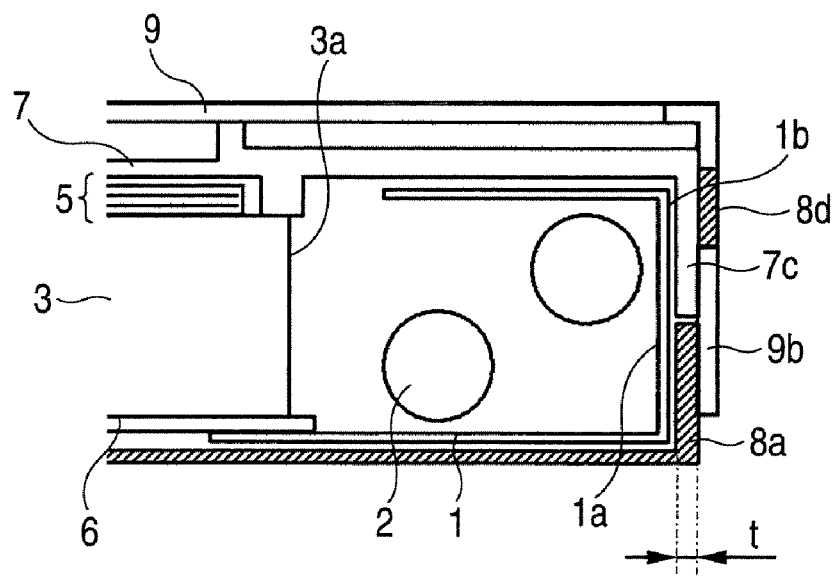

FIG. 6A is a view for explaining a connection part between the middle frame 7 and the rear frame 8 according to the embodiment 2 of the invention, and FIG. 6B is a cross-sectional view of FIG. 6A, taken along the line B-B. FIG. 7A is a view for explaining a method for fitting the rear frame 8 and the front frame 9 according to the embodiment 2 of the invention, and FIG. 7B is a cross-sectional view of FIG. 7A, taken along the line C-C.

In FIGS. 6 and 7, a bridge part 8d contacted with the convex part 7c of the middle frame 7 is formed in the concave part 8b formed on the side face 8a of the rear frame 8, and has a shape overhanging in the opposite direction to the light source 2 in the plate thickness direction. Further, the front frame 9 that supports the lamp reflector 1, the light source 2, the light guide plate 3, the display panel 4, the optical sheets 5, the reflective sheet 6, the middle frame 7 and the rear frame 8 is provided with a hole 9c at a position of the side face 9b overlaid on the side face 8a of the rear frame 8, the position corresponding to the bridge part 8d formed in the rear frame 8. Also, the bridge part 8d of the rear frame 8 and the hole 9c of the frame 9 can be fitted together within the plate thickness of the frame 9. Also, the hole 9c may be a notch. A method for connecting the convex part 7c of the middle frame 7 and the concave part 8b of the rear frame 8 is the same as in the embodiment 1.

With this constitution, even when a vibration or shock is applied from the outside in the Y direction as shown in FIG. 1, the fitting of the convex part 7c of the middle frame 7 and the concave part 8b of the rear frame 8 can be securely kept from being released. Further, since it is unnecessary to provide the rear frame 8 and the front frame 9 with a fitting structure, the structure of the rear frame 8 and the front frame 9 can be simplified.

Since the plate thickness of the bridge part 8d formed in the concave part 8b of the rear frame 8 is within the plate thickness of the front frame 9, the bridge part 8d of the rear frame 8 is fitted into the hole 9c of the front frame 9, without influence on the frame of the planer light source device.

The other configurations are the same as in the embodiment 1.

Figure 9:
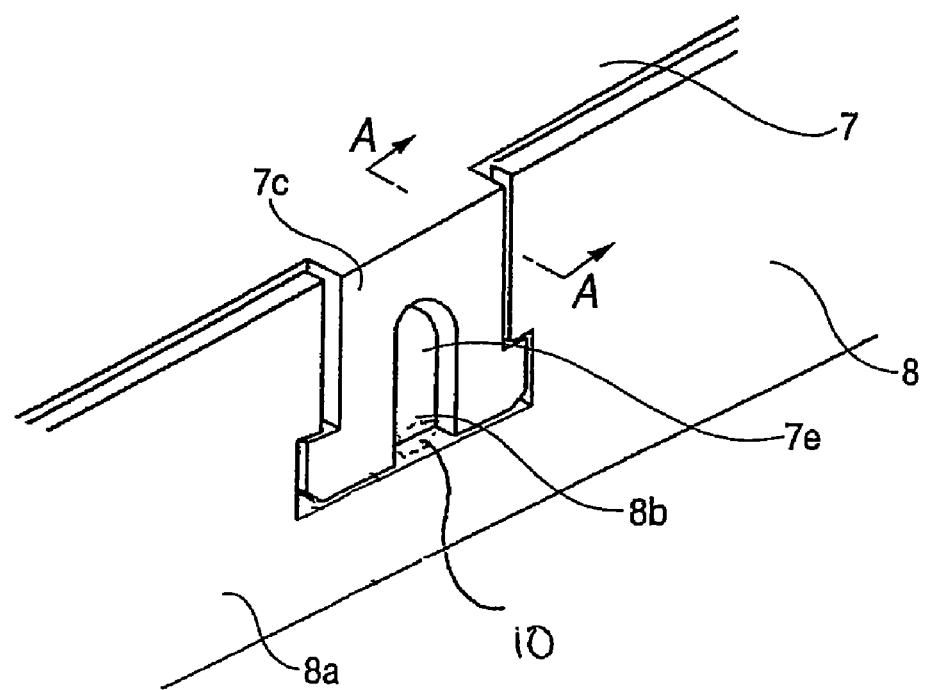
FIG. 9 is a view for explaining an adhesive resin by which the middle frame and the rear frame may be fixed.

Though in the embodiments 1 and 2, the projection part 7f of the middle frame 7 and the lock part 8c of the rear frame 8 are engaged and fixed when the convex part 7c of the middle frame 7 and the concave part 8b of the rear frame 8 are fixed, as shown in FIGS. 1 to 7, the middle frame 7 and the rear frame 8 may be fixed via an adhesive resin 10 such as a double-faced tape or adhesive without providing the projection part 7f or the lock part 8c as shown in FIG.9.

Also, though in the embodiments 1 and 2, three convex parts 7c of the middle frame 7 are formed on one side face of the middle frame 7, one convex part 7c may be provided on one side face of the middle frame 7 and fitted with the concave part 8b formed on the side face 8a of the rear frame 8, whereby the area where the side face 8a of the rear frame 8 contacts the face 1b of the lamp reflector 1 is larger, and further the heat from the light source 2 can be diffused more efficiently. The position, number and shape of the convex part 7c can be arbitrarily determined in view of the overall structure of the planer light source device.

Moreover, though in the embodiments 1 and 2, the convex part 7c of the middle frame 7 is provided on the side face at only one side, it may be provided on the side faces at opposed two sides or all the four sides, so that the middle frame 7 is connected with the rear frame 8 within the plate thickness of the rear frame 8, allowing the side faces at all the four sides to be narrower frame.

Figure 8:
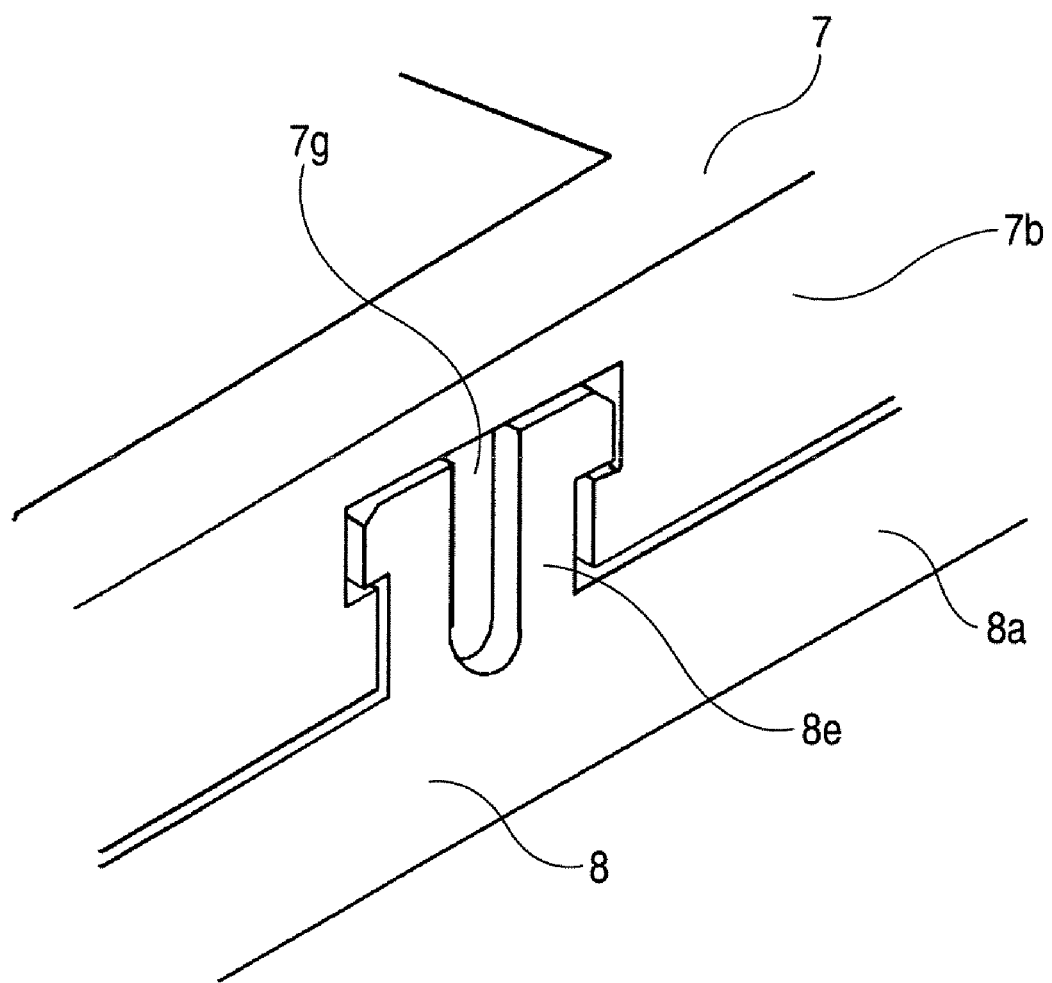
FIG. 8 is a view for explaining another method for connecting the middle frame and the rear frame according to the embodiment of the invention.

Also, in the embodiments, the convex part 7c of the middle frame 7 is formed in the direction (downward on the drawing) of the optical sheets 5 and fitted with the concave part 8b formed on the side face 8a of the rear frame 8. However, as shown in FIG. 8, a convex part 8e may be formed on the side face 8a of the rear frame 8, and a concave part 7g on the side face 7b of the middle frame 7 may be fitted with the convex part 8e on the side face 8a of the rear frame 8.

Though in the embodiments, the light guide plate 3 is like a board, the light guide plate is not limited to this form but may be like a wedge in which the thickness of the light guide plate 3 is smaller as the distance from the light source 2 is larger, whereby the incident light can be taken out efficiently and guided to the light emitting face 3b efficiently.

What is claimed is:

1. A planer light source device, comprising:
   a light source;
   a light source supporting member that supports the light source and has a first face and a second face that is opposite to the first face;
   a light guide plate having a side face opposed to the first face of the light source supporting member and a light emitting face that emits light from the light source;

a metal frame supporting the light guide plate; and a resin frame that overlies the second face of the light source supporting member and includes a connection part that connects with the metal frame within a plate thickness of the metal frame, the connection part including a convex part including a projection portion projecting from the convex part, the projection portion extending toward the metal frame to overlie the second face of the light source supporting member, the metal frame including a concave part including a recessed part engaged with the projection portion.

2. The planer light source device according to claim 1, wherein concave part is on a side face of the metal frame.

3. The planer light source device according to claim 2, wherein the convex part of the resin frame has a notch.

4. The planer light source device according to claim 2, wherein the recessed part is at a position corresponding to the projection portion within the plate thickness of the metal frame.

5. The planer light source device according to claim 1, wherein the connection part of the resin frame is formed on each of four sides of the resin frame.

6. A planer light source device, comprising:
a light source;
a light source supporting member that supports the light source and has a first face and a second face that is opposite to the first face;
a light guide plate having a side face opposed to the first face of the light source supporting member and a light emitting face that emits light from the light source;
a metal frame that supports the light guide plate;
a frame that supports the metal frame and has an opening; and
a resin frame that overlies the second face of the light source supporting member and includes a connection part that connects with the metal frame within a plate thickness of the metal frame, the connection part including a convex part, the metal frame including a concave part including a bridge part making contact with the convex part within the plate thickness of the frame, the concave part being on a side face of the metal frame and fitted into the convex part of the connection part, the frame including a hole at a position of a side face overlaid on the side face of the metal frame, the position corresponding to the bridge part in the metal frame.

7. The planer light source device according to claim 6, wherein the bridge part of the metal frame and the hole of the frame are fitted together within the plate thickness of the frame.

8. A planer light source device, comprising:
a light source:
a light source supporting member that supports the light source and has a first face and a second face that is opposite to the first face;
a light guide plate having a side face opposed to the first face of the light source supporting member and a light emitting face that emits light from the light source;
a metal frame configured to support the light guide plate; and
a resin frame overlying the second face of the light source supporting member and including a connection part that connects with the metal frame within a plate thickness of the metal frame, wherein the connection part of the resin frame is connected via an adhesive resin with the metal frame.

9. The planer light source device according to claim 8, wherein the connection part of the resin frame projects toward the metal frame from a surface of the resin frame closest to the metal frame.

* * * * *